United States Patent [19]
Murai et al.

[11] Patent Number: 4,519,768
[45] Date of Patent: May 28, 1985

[54] APPARATUS FOR HORIZONTALLY CASTING CONCRETE

[75] Inventors: Toshio Murai, Kashiwa; Hayao Aoyagi, Chiba; Masahiko Furukawa, Kashiwa; Hiromichi Yamada, Matsudo; Tateo Kawamura, Tokyo; Yoshihiro Ishikawa, Kashiwa; Akio Sakamoto, Iwatsuki; Toshiaki Tsuchiya, Yokohama; Takashi Shiozaki, Abiko; Hirokuni Kubota, Kashiwa; Isoji Okada, Yokohama; Jiro Ishii, Ibaragi; Fumio Fujii, Yotsukaido; Masakazu Nagao, Tokyo; Masamitsu Kikuchi, Tokyo; Morio Ishii, Tokyo; Yoshimasa Sasaki, Sapporo; Katsushi Tanaka, Kobe; Tadashi Itakura, Miki, all of Japan

[73] Assignees: Takenaka Komuten Co., Ltd.; Kyokuto Kaihatsu Kogyo CO., Ltd., both of Japan

[21] Appl. No.: 545,913

[22] Filed: Oct. 27, 1983

[30] Foreign Application Priority Data

Oct. 29, 1982 [JP] Japan .......................... 57-164433[U]
Apr. 25, 1983 [JP] Japan ............................ 58-61783[U]
Jul. 27, 1983 [JP] Japan ........................... 58-117058[U]
Jul. 27, 1983 [JP] Japan ........................... 58-117059[U]

[51] Int. Cl.³ ......................... B28B 21/14; B28B 1/32
[52] U.S. Cl. ................................... 425/456; 137/615; 141/387; 425/447
[58] Field of Search ............... 137/615; 141/387, 388, 141/279; 425/424, 456, 458, 447; 222/527

[56] References Cited

U.S. PATENT DOCUMENTS

| | | | |
|---|---|---|---|
| 2,160,462 | 5/1939 | Schieferstein | 425/456 |
| 3,381,711 | 5/1968 | Fye et al. | 137/615 |
| 3,409,047 | 11/1968 | Jameson | 137/615 |
| 3,572,380 | 3/1971 | Jackson et al. | 137/615 |
| 3,685,543 | 8/1972 | Schwing et al. | 137/615 |
| 3,707,990 | 1/1973 | Schaible et al. | 137/615 |
| 3,805,834 | 4/1974 | Billy | 141/387 |
| 3,964,512 | 6/1976 | Dumas | 137/615 |
| 3,976,092 | 8/1976 | Coja et al. | 137/615 |
| 4,072,283 | 2/1978 | Weiland | 141/387 |
| 4,180,170 | 12/1979 | Meinken | 137/615 |

FOREIGN PATENT DOCUMENTS

2710366 9/1978 Fed. Rep. of Germany ...... 137/615

*Primary Examiner*—Willard E. Hoag
*Attorney, Agent, or Firm*—Parkhurst & Oliff

[57] ABSTRACT

An apparatus for horizontally casting concrete comprises a horizontally foldable multilink support arm composed of an attachment frame, a proximal boom, intermediate booms, and a distal boom which are pivotally coupled by joint tubes, a drive mechanism composed of worm wheels mounted on the joint tubes and worm gears mounted on the booms and held in mesh with the worm wheels for enabling the support arm to move in articulatory motion, a concrete pressure-feed pipe extending from a pump along the booms and through the joint tubes with swivel joints, and an attachment jig mounted on the attachment frame for being mounted on a column.

8 Claims, 31 Drawing Figures

APPARATUS FOR HORIZONTALLY CASTING CONCRETE

BACKGROUND OF THE INVENTION

The present invention relates to a method of and an apparatus for horizontally casting concrete.

Various methods and apparatus have been known in the art for horizontally casting concrete with a pump. One known method utilizes pressure-feed pipes which are installed in advance and will be separated successively as the concrete casting progresses. According to another method, a distributor composed of a concrete pressure-feed pipe having a floor-mounted intermediate swivel joint is turned around to cast concrete. Still another apparatus comprises a pump vehicle having a boom. Another conventional apparatus comprises a distributor including a vertially flexible multilink boom and a concrete pressure-feed pipe extending along the multilink boom. The first concrete casting method is disadvantageous in that a transport pipe composed of the pressure-feed pipe and a pipe end hose should be placed over arranged reinforcing bars up to a concrete casting point, and the pipe should manually be replaced and the hose should manually be turned around as the casting position is moved. Furthermore, the arranged reinforced bars are disordered, the workers are subjected to physical pain, and the working efficiency is lowered. The second prior casting method is advantageous over the first method in that the working environment is improved and the reinforcing bars are prevented from being disarranged. However, since the distributor is placed on a floor mold, the latter needs to be stiffened for reinforcement, and the unfinished portion below the installed distributor must finally be completed. With the third and fourth arrangements, any concrete casting position is selected by raising and turning the boom. Therefore, they are advantageous in such construction sites as open spaces, but cannot be relied on at building construction sites where a deck plate is installed on a high building floor.

The cast concrete is compacted by a concrete vibrator supported by a vibrator worker and connected by a cabtire (vibrator) wire to a high-frequency vibrator converter located near the vibrator. The vibrator weighs about 5 to 8 kg which is too heavy for the worker to operate on for continuous vertical vibrating movement. The cabtire (vibrator) cord extending between the vibrator and the converter is cumbersome to handle.

A horizontal distributor having a multilink boom connected by a vertical pivot shaft has a steel pipe assembled on a distal end boom and a vertical brake hose depending from the distal end of the steel pipe. The vertical brake hose tends to interfere with and has to avoid obstacles such as joint bars and column bars projecting upwardly from the surface on which concrete is to be cast. The links of the boom have to be moved slightly to move forward the boom around such obstacles though the boom has a sufficient positional level. Such link movement is difficult to adjust and time-consuming to achieve.

SUMMARY OF THE INVENTION

With the prior problems in view, it is a first object of the present invention to provide an apparatus for horizontally casting concrete by freely moving a concrete transport pipe to a concrete casting position without placing the pipe on and over the floor, thereby preventing arranged reinforcing bars from being disturbed or smeared due to any turning movement of the pipe end hose, freeing the workers from hard operations such as replacement of the pipe and turning of the hose to thereby reduce casting difficulties, increasing the casting efficiency per worker, and allowing desired casting operation even if there is an obstruction above the construction site.

A second object of the present invention is to improve the use of a concrete vibrator for saving labor.

A third object of the present invention is to improve the flexing of a boom due to the weight of a horizontal distributor and the weight of a mass of concrete.

A fourth object of the present invention is to solve the problem of difficult and time-consuming adjustment of the links of a horizontal distributor boom as it moves to avoid obstacles.

A fifth object of the present invention is to provide a device for expanding and contracting a distal end of a horizontal distributor.

A sixth object of the present invention is to improve an attachment of a horizontal distributor to a column.

A seventh object of the present invention is to provide a method of automatically casting concrete through automatic control of a horizontal distributor.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

The present invention will be described with reference to the drawings with the foregoing objects set forth above being taken into consideration.

The first object can be achieved by providing an articulatory or multilink support arm foldable in a horizontal plane and composed of an attachment frame, intermediate booms, and a distal boom pivotally joined by vertical joint tubes, the support arm being articulately movable by a drive mechanism composed of a worm wheel integral with each vertical tube and a worm gear attached to each boom, and a concrete pressure-feed pipe connected to a pump and extending along the booms and through the vertical tubes via swivel joints, the distal boom having a gondola and a control panel, and the attachment frame having an attachment jig for attachment to a column.

Figure 1A:
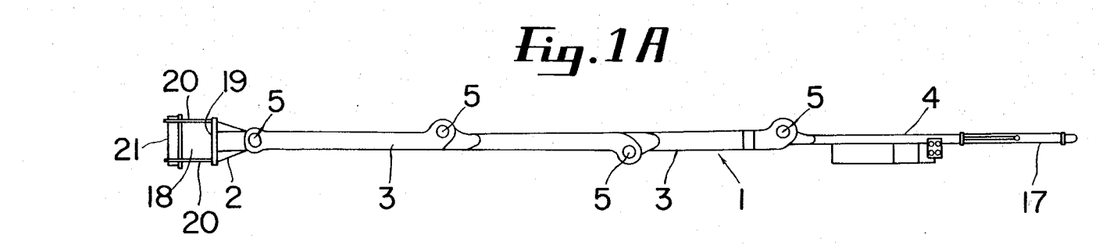
FIGS. 1A and 1B are plan and front elevational views of an apparatus of the present invention.
Figure 1B:
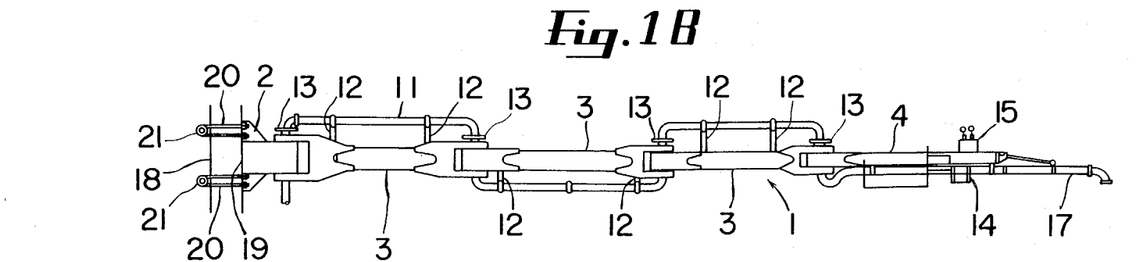

FIGS. 1A and 1B are plan and front elevational views of an apparatus of the present invention. The apparatus includes a support arm 1 along which a concrete pressure-feed tube extends. The support arm 1 is composed of an attachment frame 2, intermediate booms 3, and a distal boom 4 all pivotally coupled end to end by pivot joints comprising vertical tubes 5. The support arm 1 is thus of an articulatory or multilink construction foldable in a horizontal plane.

Although three intermediate booms 3 are shown in the illustrated embodiment, more or less booms may be provided dependent on various considerations such as the distance to a concrete casting position.

Figure 2:
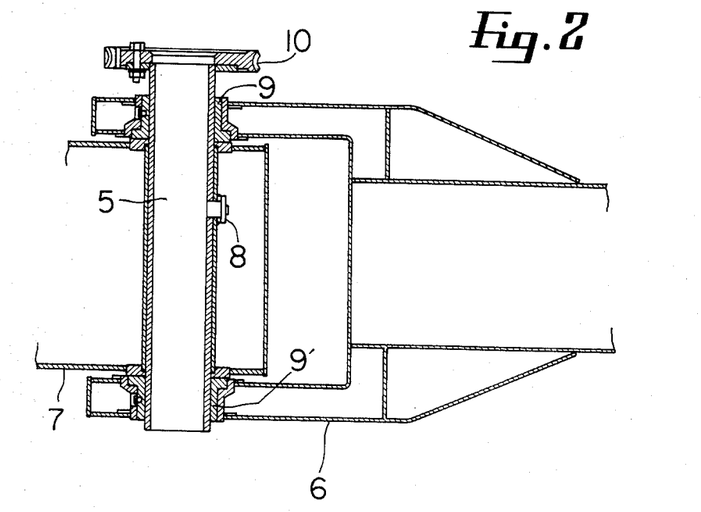
FIG. 2 is an enlarged fragmentary longitudinal cross-sectional view of the apparatus.

As illustrated in FIG. 2, each pivot joint is constructed such that the vertical tube 5 extends through upper and lower brackets 6 on one end of a boom and an end 7 of an associated boom which is interposed between the upper and lower brackets 6. The boom end 7 and the vertical tube 5 are securely fixed together by a shaft fixing pin 8. The vertical tube 5 is journalled in the brackets 6 through bushings 9, 9'.

The vertical tube 5 has an upwardly projecting end to which a worm wheel 10 is fastened. A worm gear (not shown) is mounted on the upper bracket 6 in mesh with the worm wheel 10. The worm wheel and gear are driven by a hydraulic motor (not shown) for bending the coupled booms.

Figure 1C:
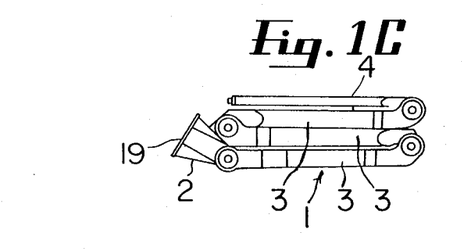
FIG. 1C is a plan view of the apparatus as it is folded for storage.

The brackets 6 and the boom ends 7 of the booms are displaced alternately in opposite directions laterally off the axes of the booms, as shown in FIG. 1A, so that the booms can be folded or collapsed for storage as shown in FIG. 1C.

As illustrated in FIG. 1B, the apparatus includes a concrete pressure-feed pipe 11 extending from a pump (not shown) along the axes of the booms 3, 4 and through the vertical tubes 5 by swivel joints 13. Since the walls of the vertical tubes 5 do not serve as concrete pressure-feed tube walls, they can advantageously be replaced with ease when worn by repeated use for pressure feeding of concrete.

Figure 3:
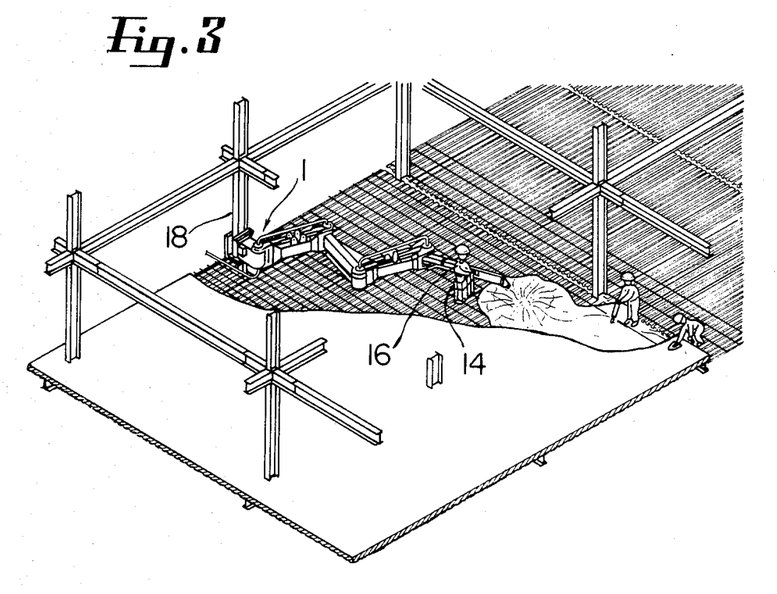
FIG. 3 is a fragmentary perspective view of a construction site, showing the manner in which the apparatus of the invention is used in operation.

A gondola 14 and a control panel 15 are attached to the distal boom 4. In operation, as shown in FIG. 3, an operator 16 riding in the gondola 14 operates on the control panel 15 for manuevering the apparatus to turn and move back and forth toward a desired position while closely seeing a casting point in perspective.

An extensible pressure-feed tube 17 depends from the distal boom 4 and has a rotatable discharge port, the tube 17 being coupled to the concrete pressure-feed pipe 11. While the booms are turned around, the discharge port can be directed upwardly to prevent any concrete in the tube 17 from dropping off.

The attachment frame 2 has an attachment plate 19 attached intimately to a column 18 (made of S, SRC, RC, or in the form of a temporary shelf pipe or a guide pile) and securely attached to the column by U bolts 20 fastened to the attachment plate 19 and engaging transverse bars 21 held against the rear surface of the column 18.

Solenoid-operated proportional valves are employed to control the rate of oil flow for turning the distal boom 4 at the same speed regardless of which hydraulic motor is actuated.

As described above, the apparatus has its attachment plate on a proximal end thereof secured to the column positioned in the surface on which concrete is to be cast, and hence can extend into deep corners smoothly without being interrupted. The apparatus is quite advantageous in actual use.

Figure 4A:
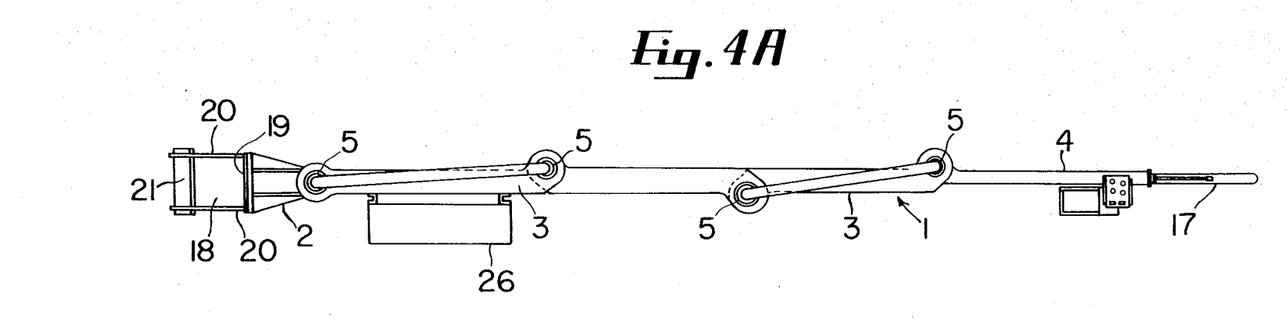
FIGS. 4A and 4B are plan and front elevational views of an apparatus according to another embodiment of the present invention.
Figure 4B:
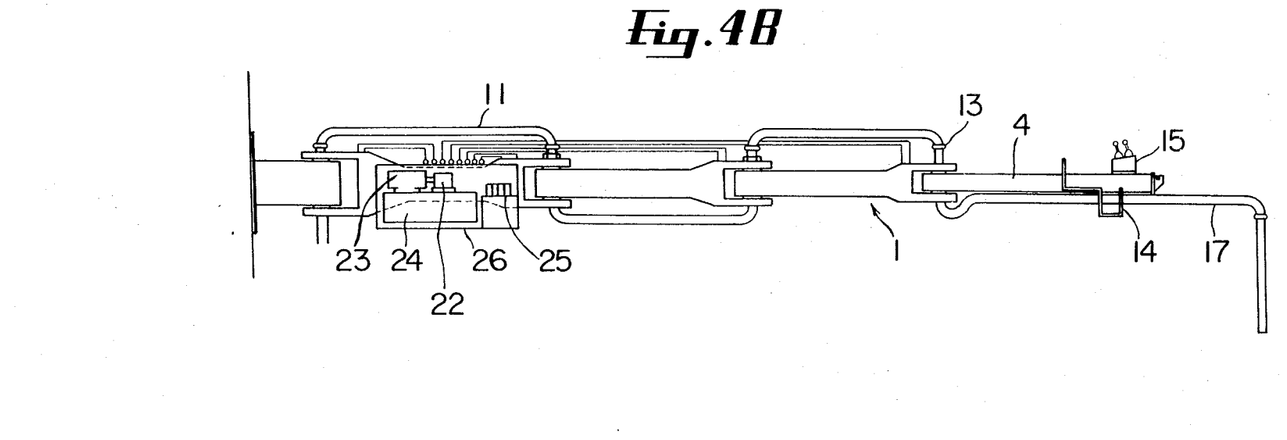

According to another embodiment of FIGS. 4A and 4B, an electric motor 25 and a hydraulic power unit 26 composed hydraulic pump 23, an oil tank 24, and a hydraulic control valve 25 for powering a mechanism for turning the booms are mounted on a proximal end of an intermediate boom 3, the hydraulic control valve 25 being electrically controlled by a control panel 15. This arrangement allows the apparatus to be moved around without having to separate and connect hydraulic pipes and effect associated troublesome operations, and is more advantageous than arrangements with the power units separately located.

Figure 5A:
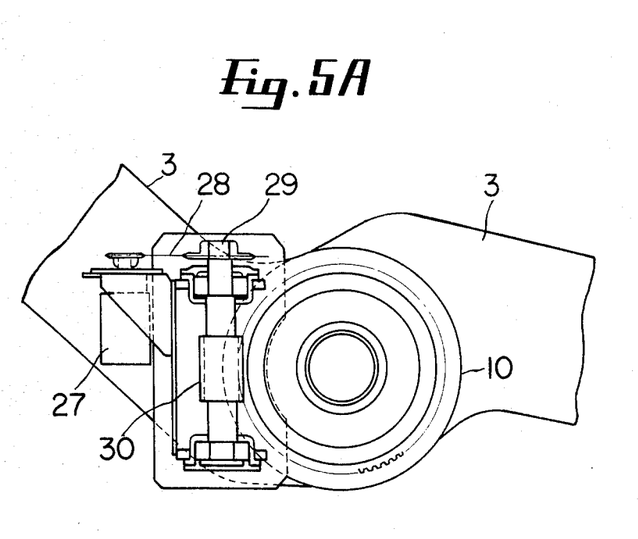
FIGS. 5A and 5B are enlarged fragmentary plan and front elevational views of the apparatus shown in FIGS. 4A and 4B.
Figure 5B:
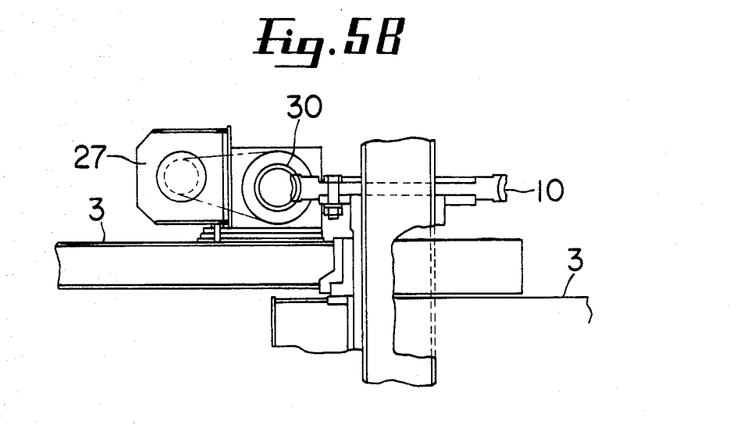

FIGS. 5A and 5B show a worm gear 30 securely mounted on a shaft 29 driven to rotate by a hydraulic motor 27 through a power transmission chain 28.

The second object can be accomplished by providing a cord extending from a converter to a concrete vibrator at the distal end of the horizontal concrete distributor proposed by the first object, the cord extending along the multilink booms and being wound around a cabtire cord reel for taking up any unwanted slackening, and by allowing the operator of the distributor to actuate a power supply switch.

Figures 6A, 6B, 7:
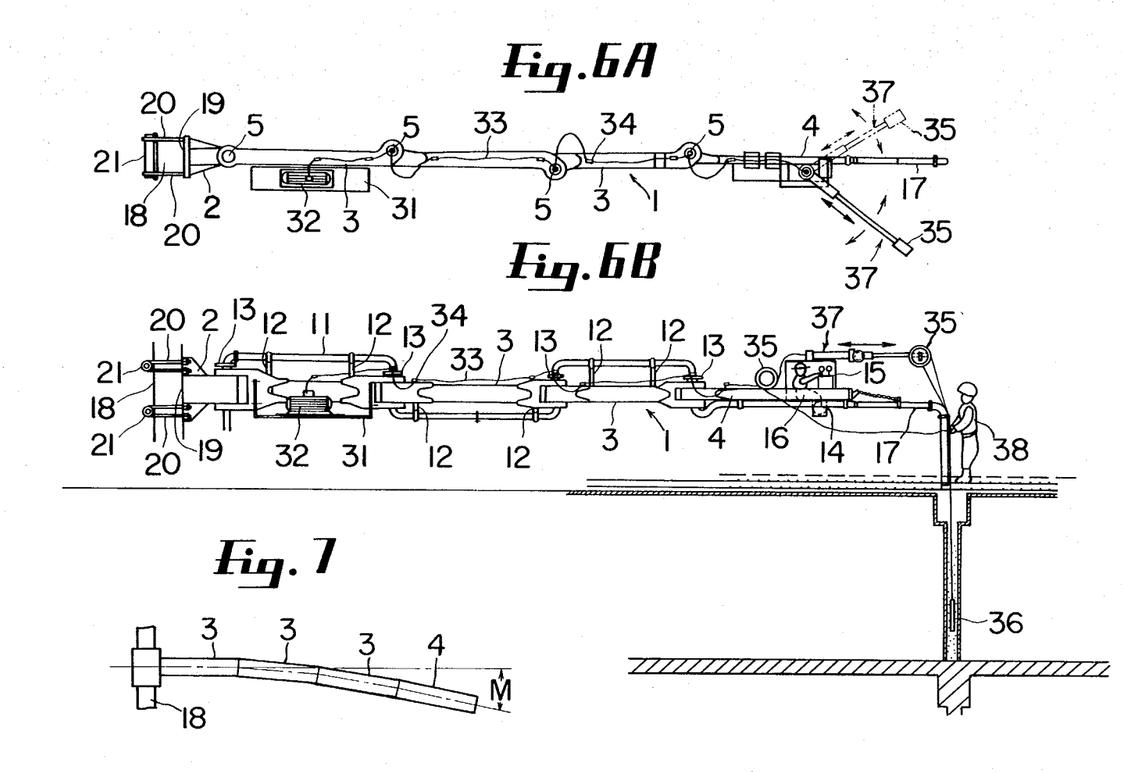
FIGS. 6A and 6B are plan and front elevational views of an apparatus according to still another embodiment of the present invention.
FIG. 7 is a view showing the manner in which to cope with the normal flexing of a distal end.

More specifically, as shown in FIGS. 6A and 6B, a high-frequency vibrator converter 32 is mounted on an installation frame 31 attached to an intermediate boom 3, and a cabtire cord 33 extends along the booms 3 and attached thereto by fasteners 34.

A cabtire cord reel 35 is mounted on the distal boom 4 and is capable of winding back the cabtire cord 33 to prevent the latter from being slackened between the cabtire core reel 35 and a concrete vibrator 36. The cabtire cord reel 35 may be mounted on an attachment arm 37 which is horizontally swingable and longitudinally extendible and contractable, or may simply be mounted on the distal boom 4.

With the former alternative, a worker 38 for handling the concrete vibrator 36 only needs to put hands against the cabtire cord 33 supported by the cabtire cord reel 35 to guide the cord 33 within the range of angular movement of the attachment arm 37. According to the latter arrangement, however, the cabtire cord reel 35 must be extended to the location where the concrete vibrator 36 is to be used, and then the worker 38 must support the concrete vibrator 36.

At any rate, the cord leading to the concrete vibrator 36 extends around the cabtire cord reel 25 under tension without being slackened into interference with activities of the workers.

A power supply switch for the concrete vibrator 36 is attached to the control panel 15 and will be operated upon by the operator 16.

While in the prior art two workers have been required to attend a single vibrator, only one worker can take care of the vibrator according to the illustrated arrangement. This means that three workers may be dispensed with since a single pump vehicle is normally equipped with three vibrators. It is not necessary to manually bring the cabtire cord to the area in which the vibrator is to be used, and the cord extending in between may not be attended.

The third object arises from the following background: The multilink or articulatory booms are subjected to flexing due to their own weight and the weight of concrete carried thereby. Where the booms are made of high-strength material, they are highly resistant to bending stresses due to bending moments, but the distal end of the elongate boom assembly suffers from a large degree of downward flexing. Such a difficulty has heretofore been eliminated by elevating the position of attachment of the apparatus by a distance equal to the extent M of flexing of the booms, as shown in FIG. 7. This solution results in 30 to 40 cm of wasteful use of the allowed height for attachment of the apparatus, and may present an attachment problem in buildings having floor height limitations.

The above shortcoming can be obviated according to the present invention by constructing pivot joints in the respective booms connected to the proximal boom such that pivot shafts extend vertically through brackets, but the booms are inclined upwardly to the pivot shafts to give the pivot joints the pre-flexing which will cancel out the flexing of the booms due to the weight thereof. The booms will then extend substantially horizontally during use and operate smoothly in a building having floor height limitations.

Figure 8A:
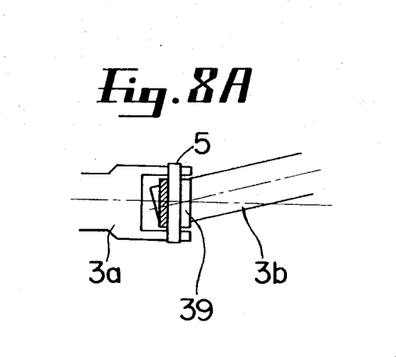
FIGS. 8A, 8B, and 8C are fragmentary side elevational, enlarged cross-sectional, and side elevational views of an arrangement for preventing the flexing of the boom.
Figure 8B:
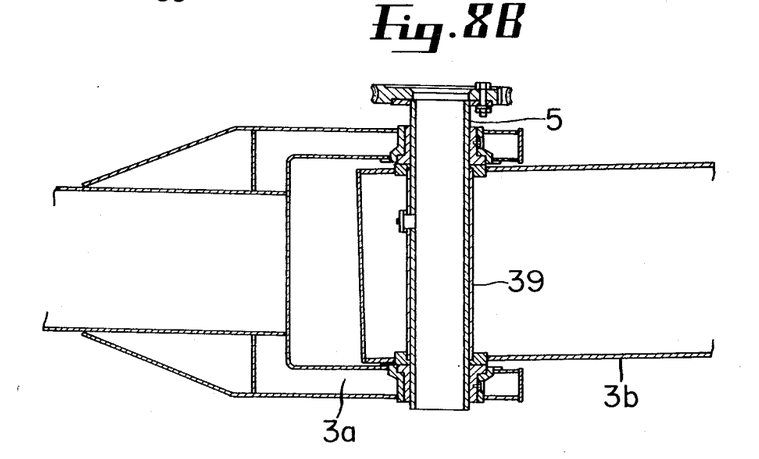

FIGS. 8A, 8B and 8C are fragmentary side elevational, an enlarged cross-sectional, and side elevational views of a boom assembly composed of a proximal boom 3a and booms 3b pivotally coupled thereto. As shown in FIG. 8A, a vertical tube 5 is attached to and extends vertically perpendicularly through brackets at the distal end of the proximal boom 3a. The boom 3b (FIGS. 8A and 8B) attached to the proximal boom 3a is inclined upwardly at an angle $\theta$ to the axis of the proximal boom 3a by suitable means such as eccentric bosses 39. The angles of inclination of the boom are selected such that the accumulated degrees of flexing of the pivot joints will cancel out the extent of flexing of the booms due to the weight thereof during operation.

Figure 8C:
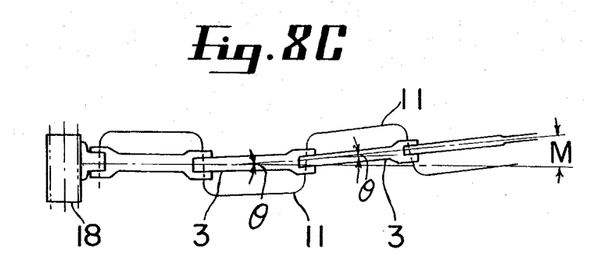

Prior to casting concrete, the multilink boom assembly 1' is progressively inclined upwardly toward the distal end as shown in FIG. 8C. When the weight of concrete is imposed on the booms during concrete casting operation, the distal and proximal ends of the boom assembly lie substantially at the same level. Since the pivot shafts extend normally to the axis of the boom assembly, the boom assembly with no load imposed will be kept at the same angle of inclination regardless of how the boom assembly is angularly moved, and there will be no difference between the levels of the distal and proximal ends of the boom assembly irrespectively of the direction in which the boom assembly is extended or contracted.

Any limitations on the height of attachment of the boom assembly can therefore be reduced, and the apparatus can be used in buildings in which the floor height is smaller and there are more obstacles. Other advantages accruing from the inclined boom assembly are as follows:

(i) When the boom assembly is fully extended in a space having a small vertical interval, the boom assembly of the invention does not suffer from unwanted flexing due to its own weight and can allow unobstructed concrete casting.

(ii) The boom assembly as maintained substantially horizontally during operation enables the worker to work smoothly and easily on the control panel and the work cage or gondola attached to the distal boom.

The fourth object can be accomplished by providing a proximal end lifting and lowering member associated with lifting and a lowering means and horizontally pivotally attached to a distal end of a distal boom, and a distal end lifting and lowering member associated with a lifting and lowering means and horizontally pivotally attached to a distal end of the proximal end lifting and lowering member, the distal end lifting and lowering member being vertically swingable, there being a flexible hose connected to a concrete pressure-feed pipe and extending along the proximal and distal end lifting and lowering members.

Figures 9A, 9B, 9C:
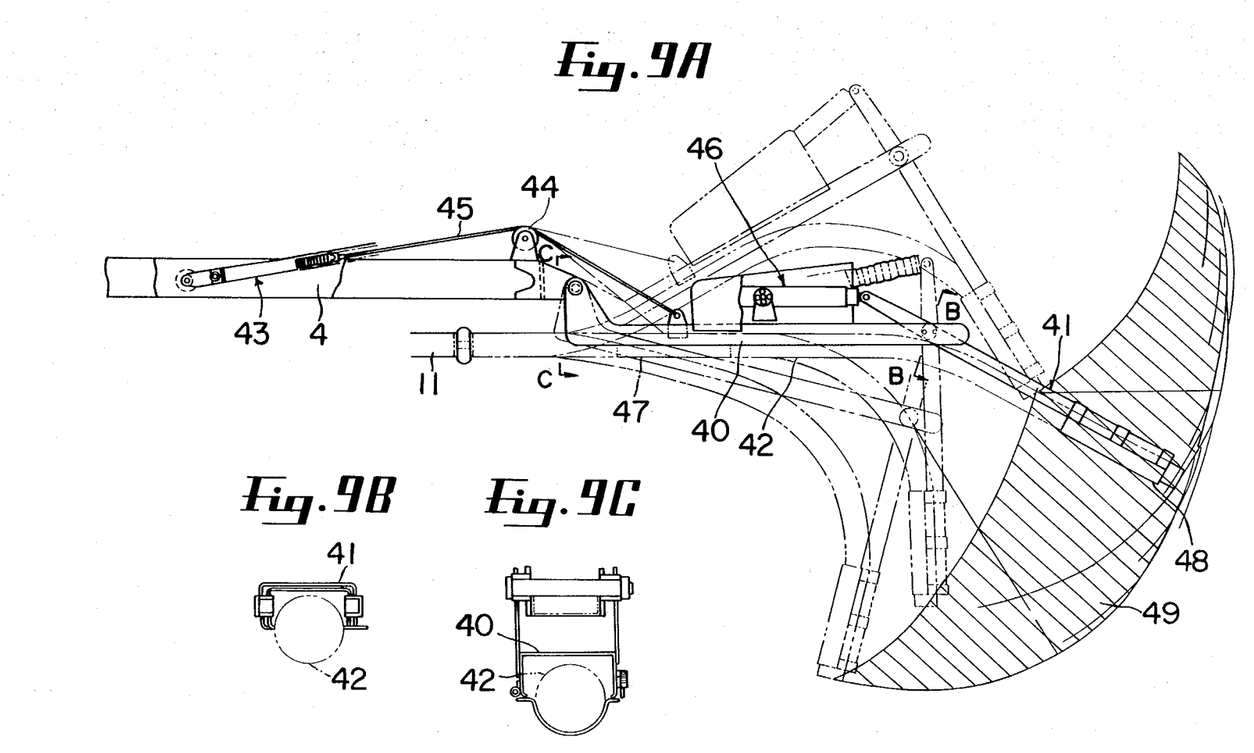
FIG. 9A is an enlarged fragmentary side elevational view of an apparatus of the present invention.
FIGS. 9B and 9C are enlarged cross-sectional views taken along lines B—B and C—C of FIG. 9A.

In FIGS. 9A through 9C, a proximal end lifting and lowering member 40 is operatively coupled to a lifting and lowering means composed of a hydraulic cylinder 43 having its proximal end pivotally joined to a distal boom 4, a sheave 44 mounted on a distal end of the distal boom 4, and a wire 45 extending around the sheave 44 and having one end fastened to the proximal end lifting and lowering member 40 and the other end fastened to the hydraulic cylinder 43.

A hydraulic cylinder 46 is pivotally supported on the proximal end lifting and lowering member 40 and has a distal end horizontally pivotally mounted on a proximal end of a distal end lifting and lowering member 41. The hydraulic cylinder 46 thus serves as a distal end lifting and lowering means for the distal end lifting and lower member 41.

The flexible hose 42 is attached to the undersides of the lifting and lowering members 40, 41 by supports 47, 48.

The flexible hose 42 can be moved in the range 49 shown hatched in FIG. 9A by operating the two lifting and lowering means described above to thereby allow a distal end of the hose 42 to move in certain vertical and back-and-forth ranges. When the hose 42 is vertically moved, its distal end can move forward while moving upwardly to avoid any obstacle, and when the hose 42 is moved back and forth, its distal end can move a small distance in the radial direction. This construction is highly advantageous compared to prior arrangements in which the hose can only be controlled through a horizontal link.

Concrete in the hose 42 can be prevented from dropping off by keeping the distal end of the hose in a lifted position while the hose 42 is being moved around.

The fifth object arises out of the following circumstances:

(i) There are two or three positions in which concrete should be cast outside an operation range of the apparatus.

(ii) It is time-consuming to move the distal end of a concrete pressure-feed pipe since the mechanism allows only rotary movement of links.

Figure 10:
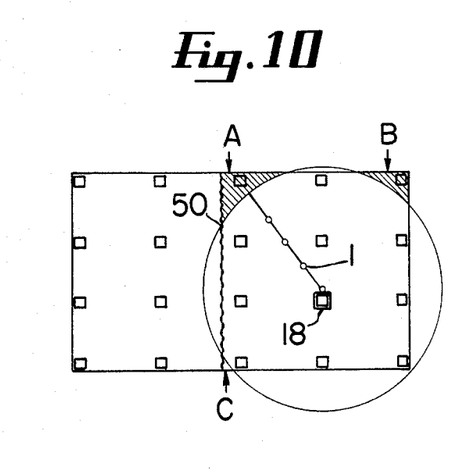
FIGS. 10 and 11 are views illustrative of a problem encountered in casting concrete.
Figure 11:
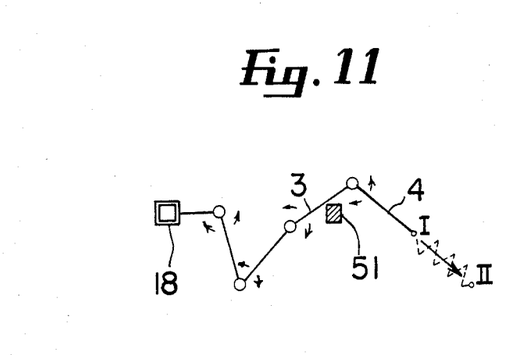
Figure 12A:
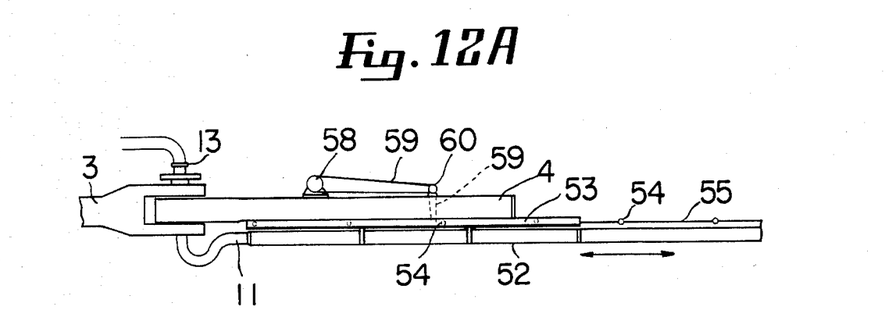
FIGS. 12A, 12B, 12C, and 12D are front elevational, enlarged fragmentary cross-sectional, and fragmentary plan views of an apparatus of the present invention.
Figure 12B:
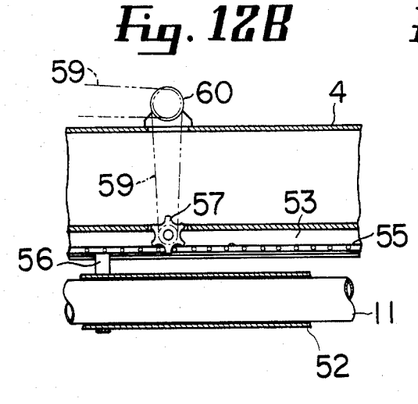
Figure 12C:
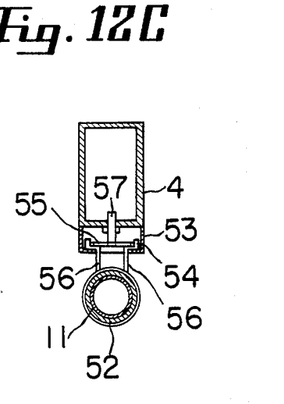
Figure 12D:
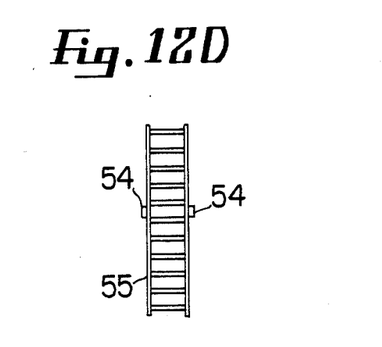

The circumstances (i) and (ii) are illustrated in FIGS. 10 and 11. FIG. 10 shows the circumstance (i) in which the concrete pressure-feed pipe can not reach areas A, B, C for casting concrete. To cast concrete in the areas A, B, C, concrete is first discharged in the operation range, and then it is manually scooped into the areas A, B, C. FIG. 11 shows the circumstance (ii) in which the distal end of the pipe moves along a path indicated by the broken line as the pipe is required to be moved along while the links are rotated by the operator who manipulates a control lever. When there is an obtacle in the way of rotating movement of the link, the operator's control action to avoid the obstacle becomes complex and time-consuming.

In FIG. 10, the zone in which concrete is to be cast is rectangular, and there are corner areas A, B, C which can not be reached by the boom assembly for casting concrete. Designated at 50 is a casting joint. In FIG. 11, the links have to be actuated when the end of the pipe needs to be moved from a position I to a position II. Designated at 51 is an obstacle which the boom assembly should avoid.

The above problems can be solved by providing an extendible and contractable slide pipe fitted over a pressure-feed pipe extending along a distal boom and depending from a movable ladder-like rack having rollers mounted on a guide on a lower portion of a frame of the distal boom, the ladder-like rack being held in mesh with a pinion rotatable in opposite directions by a drive unit for extending and contracting the slide pipe through the rack attached thereto.

As shown in FIGS. 12A through 12D, a slide pipe 52 is fitted over a pressure-feed pipe 11 extending along a distal boom 4 having a guide 53 mounted on the lower portion of a frame of the distal boom 4. A movable ladder-like rack 55 has rollers 54 rollingly mounted on the guide 53. The slide pipe 52 depends from the ladder-like rack 55 through a vertical arm 56. A pinion 57 is mounted on the distal boom 4 and meshes with the ladder-like rack 55. The pinion 57 is driven by a chain 59 driven by an intermediate pinion 60 driven through another chain 59 by a drive unit 58 composed of a hydraulic motor or electric motor and a speed reducer.

Rotative power from the drive unit 58 is transmitted to the pinion 57 mounted on the distal boom 4 to cause the ladder-like rack 55 to slide horizontally to extend or contract the slide pipe 52 depending from the ladder-like rack 55.

The above arrangement has the following advantages.

(i) The distributor has a wider range in which concrete can be cast thereby.

(ii) When the pressure-pipe is retracted for storage, the boom assembly remains compact as before.

(iii) The distal end of the distal boom can simply be positioned (through two movements, such as turning and extension, for example).

(iv) The distal end of the distal boom can be positioned in a reduced period of time.

Figure 13:
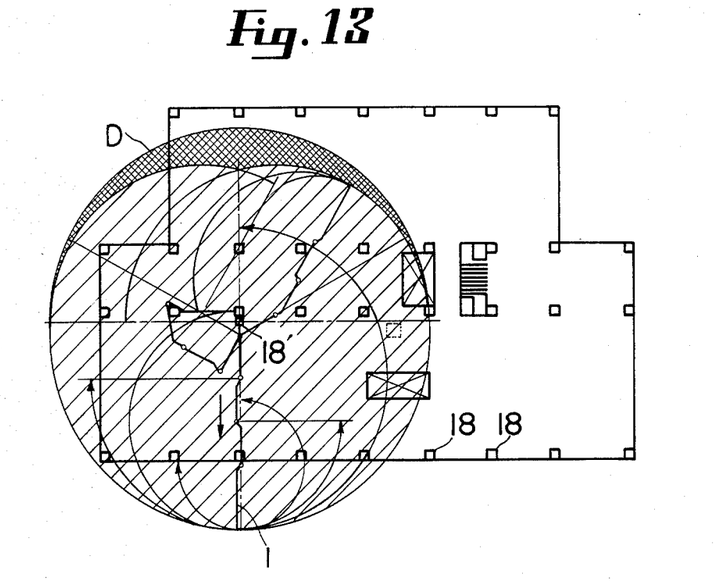
FIG. 13 is a view explanatory of the manner in which to cast concrete with an apparatus mounted on an attachment in one fixed direction.

The sixth object arises out of the following condition:

As illustrated in FIG. 13, the apparatus is attached in fixed one direction to an attachment column 18', and a first link (proximal boom) is angularly movable through a maximum angle which is limited to 240 degrees. Accordingly, any attempt to cast concrete in a position rearward of the direction in which apparatus is attached has suffered from the problems:

(i) It takes a long period of time to move the boom assembly to the casting position.

(ii) No concrete can be cast in an area D illustrated in FIG. 13.

These problems can be solved by providing upper and lower tubular bases fitted over a tubular member fastened to an attachment column, the tubular bases being vertically splittable into halves, the upper tubular base having inner teeth on an inner peripheral surface thereof and the tubular member having outer teeth on an outer peripheral surface thereof, upper and lower power tranmission mechanisms mounted on an attachment frame by gears and shafts and operatively connected to a drive unit mounted on a proximal boom, the attachment frame having upper and lower reaction take-up rollers and a running roller for rotation around the attachment column through 360 degrees.

Figure 14A:
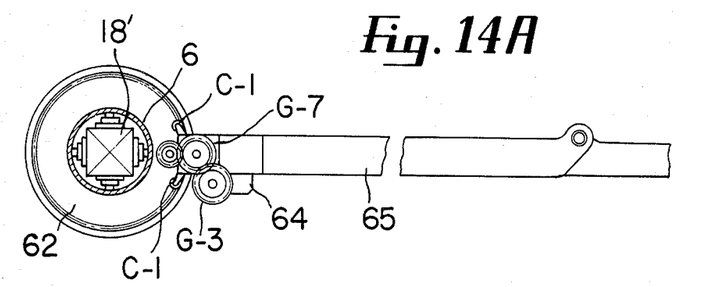
FIGS. 14A, 14B, and 14C are plan, front elevational, and enlarged plan views of an improved attachment.
Figure 14B:
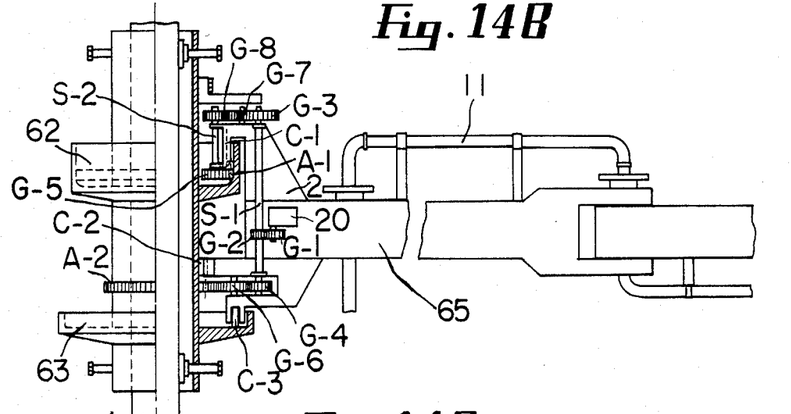
Figure 14C:
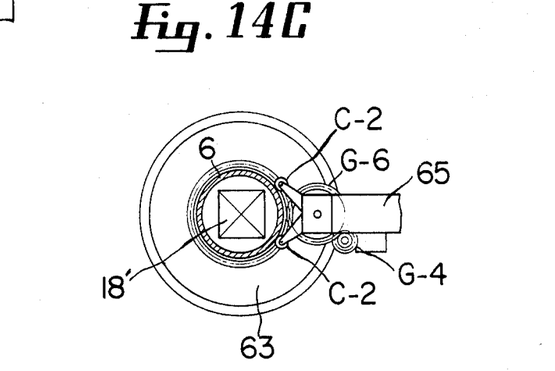

More specifically, as illustrated in FIGS. 14A, 14B, 14C, a tubular member 61 is fastened to and around the attachment column 18', and upper and lower tubular bases 62, 63 are attached to the tubular member 61 at upper and lower positions thereon, the upper and lower tubular bases 62, 63 being vertically splittable into halves for easy removal and attachment. Desgniated at 64 is a motor (an electric motor or a hydraulic motor with a speed reducer) serving as a drive unit mounted on a proximal boom which provides support for an attachment frame 2. Rotative power from the motor 64 is transmitted through spur gears G-1, G-2 to a shaft S-1 mounted on and along the attachment frame 2 and also through spur gears G-3, G-4 fixed to upper and lower portions of the shaft S-1 and upper and lower spur gears G-7, G-8 to a shaft S-2 mounted on and along the attachment frame 2 and having a spur gear G-5 fixed to a lower end thereof and also to a spur gear G-6 mounted on the attachment frame 2. Thus, these shafts and gears constitute upper and lower motor-driven mechanisms. The upper base 62 and the tubular member 61 have inner and outer gears A-1, A-2 defined respectively on inner and outer peripheral surfaces thereof and held in mesh with the spur gears G-5, G-6. Reaction take-up rollers C-1, C-2 are mounted on the attachment frame 2 at upper and lower positions thereon, and a running roller C-3 is mounted on a lower side of the attachment frame 2. The proximal boom attached to the attachment frame 2 can therefore rotate freely around the attachment column 18' through 360 degrees.

With the arrangement of the present invention, the direction in which the distributor is attached is aligned with any desired casting position, thus eliminating areas located rearward of the direction of attachment of the distributor and increasing the range in which concrete can be cast by the distributor.

Figure 15:
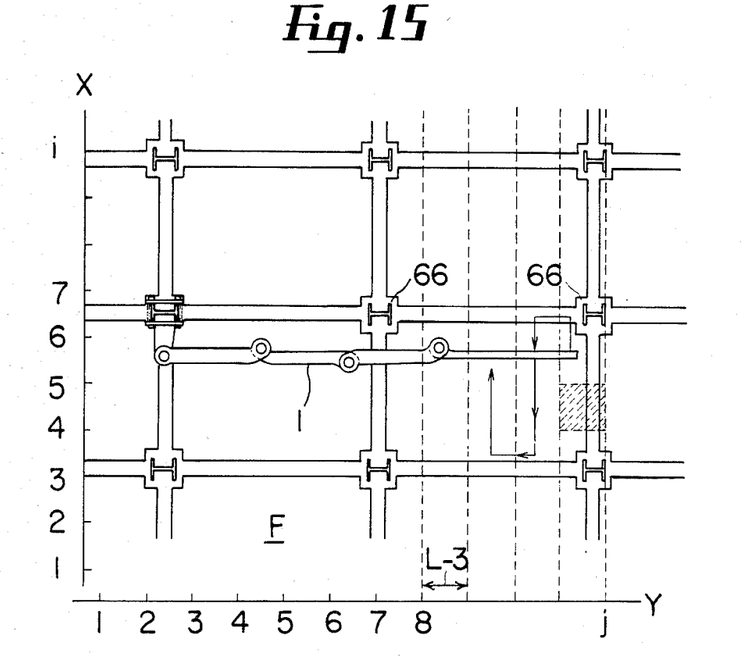
FIGS. 15 and 16 are plan and front elevational views of a floor on which concrete is to be cast.
Figure 16:
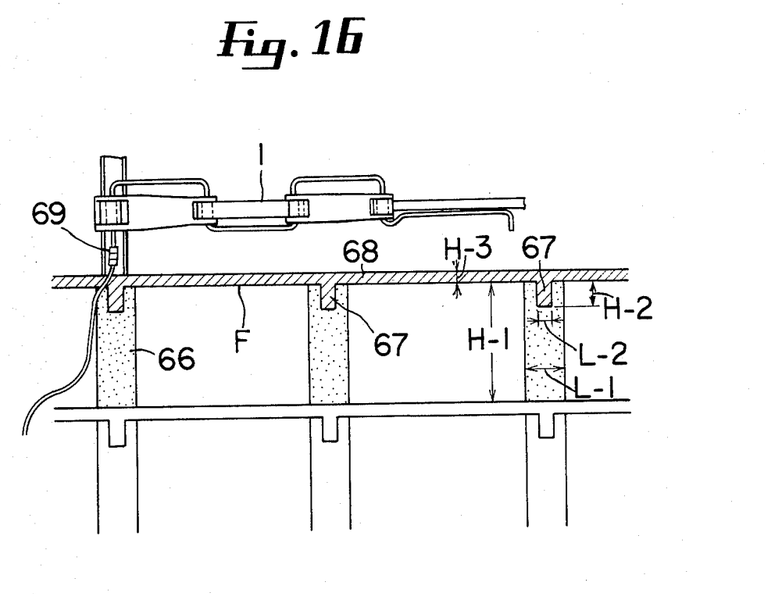

The seventh object arises out of the following circumstance. The horizontal distributor of the present invention can be automatically controlled by robotics technology presently available. As shown in FIG. 15, for example, a casting range on a floor F on which concrete is to be cast is expressed by coordinates given by $1, 2, 3, \ldots i$ on an X-axis and $1, 2, 3, \ldots i$ on a Y-axis, defining a matrix of rectangular positions, and the distal end of the horizontal distributor 1 is automatically controlled to move along continuous intermediate paths expressed by $[(i-1)+i]\frac{1}{2}$, $[(j-1)+j]\frac{1}{2}$ which do not overlap each other. Designated at 66 are columns. Concrete is cast in different quantities along such paths. As shown in FIG. 16, concrete is cast in varying volumes having a height H-1 and a width L-1 at the column 66, a height H-2 and a width L-2 at a beam 67, and a height H-3 and a width L-3 at a floor 68.

Figure 17:
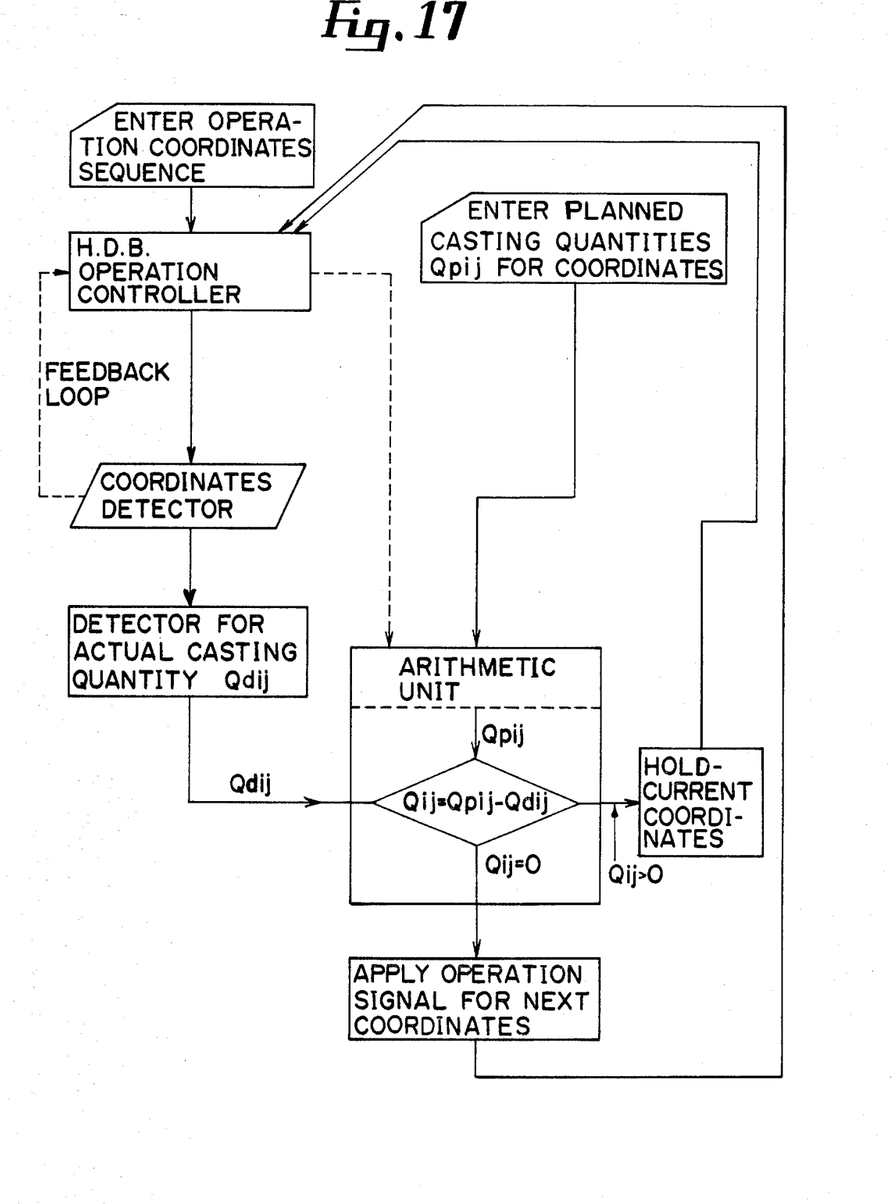
FIG. 17 is a block diagram of a system for effecting a method according to the present invention.

The object is to automatically cast desired quantities of concrete and automatically control a concrete casting machine more completely under such conditions. This object can be achieved by providing a concrete feed rate detector 69 on the concrete casting machine such as a horizontal distributor as shown in FIG. 16. A planned casting quantity of concrete and an actual quantity of concrete fed under pressure in each coordinate position on the floor are compared. If the planned casting quantity is greater than the actual quantity, then, concrete is cast in that position. If the planned quantity is equal to the actual quantity, then the horizontal distributor is moved on to a next coordinate position according to the operation coordinates sequence which has been entered in advance. FIG. 17 is a block diagram of a system, with a flowchart being also shown, for carrying out the above method of the present invention.

By entering an automatic coordinates sequence in advance, automatic operation control for casting concrete in a predetermined quantity can be started and stopped by employing a planned quantity $Q_{pij}$ of concrete to be cast and an actual quantity $Q_{dij}$ of concrete fed under pressure.

Although certain preferred embodiments have been shown and described, it should be understood that many changes and modifications may be made therein without departing from the scope of the appended claims.

What is claimed is:

1. An apparatus for horizontally casting concrete comprising a horizontally foldable multilink support arm composed of an attachment frame, a proximal boom, intermediate booms, and a distal boom which are pivotally coupled by joint tubes, a drive mechanism composed of worm wheels mounted on said joint tubes and worm gears mounted on said booms and held in mesh with said worm wheels for enabling said support arm to move in articulatory motion, a concrete pressure-feed pipe extending from a pump along said booms and through said joint tubes with swivel joints, and an attachment jig mounted on said attachment frame for being mounted on a column.

2. An apparatus according to claim 1, including a gondola and a control panel mounted on said distal boom.

3. An apparatus according to claim 1, including a concrete vibrator, a vibrator converter, a vibrator cord reel mounted on said distal boom, and a vibrator cord connected between said concrete vibrator and said vibrator converter and extending along said booms and around said vibrator reel.

4. An apparatus according to claim 1, including a concrete vibrator, a vibrator converter, a vibrator cord reel mounted on said distal boom, a vibrator cord connected between said concrete vibrator and said vibrator converter and extending along said booms and around said vibrator reel, and a power supply switch positioned at an operator's seat on a distributor for actuating said concrete vibrator.

5. An apparatus according to claim 1, wherein said intermediate and distal booms have brackets and are pivotally joined by pivot joints including said joint tubes and pivot shafts extending perpendicularly through said brackets, said intermediate and distal booms being inclined upwardly to give said support arm pre-flexing, so that said support arm will be held substantially horizontally during use.

6. An apparatus according to claim 1, including a proximal end lifting and lowering member having lifting and lowering means and horizontally pivotally mounted on a distal end of said distal boom, a distal end lifting and lowering member having lifting and lower means and horizontally pivotally mounted on a distal end of said proximal end lifting and lowering member, said distal end lifting and lowering member being vertically swingable, and a flexible hose connected to said concrete pressure-feed pipe and extending along said proximal and distal end lifting and lowering members.

7. An apparatus according to claim 1, including an extensible and contractable slide pipe fitted over said concrete pressure-feed pipe extending along said distal boom, a movable ladder-like rack having rollers mounted on a guide attached to a lower portion of a frame of said distal boom, said slide pipe depending from said ladder-like rack, and a pinion held in mesh with said ladder-like rack and rotatable in opposite directions by a drive unit for extending and contracting said slide pipe attached to said ladder-like rack.

8. An apparatus according to claim 1, including an attachment structure for attachment to said column, comprising a tubular member for being fastened to said column, upper and lower tubular bases disposed around said tubular member and vertically splittable into halves, said upper and lower tubular bases having inner and outer teeths on inner and outer peripheral surfaces thereof, respectively, upper and lower power transmission mechanisms mounted on said attachment frame and having gears and shafts operatively connected to a drive unit mounted on said proximal boom, and upper and lower reaction take-up rollers and a running roller mounted on said attachment frame.

* * * * *